US012677765B2

(12) United States Patent
Miller et al.

(10) Patent No.: US 12,677,765 B2
(45) Date of Patent: Jul. 14, 2026

(54) MOBILE IRRIGATION SYSTEM WITH PLASTIC OPTICAL FIBER NETWORK

(71) Applicant: Lindsay Corporation, Omaha, NE (US)

(72) Inventors: Mark William Miller, Omaha, NE (US); Steve Aikman, Omaha, NE (US); Bradford L. Ellison, Omaha, NE (US); Sandra Regia Patricia Figueiredo da Silveira, Omaha, NE (US)

(73) Assignee: Lindsay Corporation, Omaha, NE (US)

( * ) Notice: Subject to any disclaimer, the term of this patent is extended or adjusted under 35 U.S.C. 154(b) by 385 days.

(21) Appl. No.: 18/508,768

(22) Filed: Nov. 14, 2023

(65) Prior Publication Data

US 2025/0151680 A1 May 15, 2025

(51) Int. Cl.
  *A01G 25/09* (2006.01)
  *A01G 25/16* (2006.01)
(52) U.S. Cl.
  CPC ......... *A01G 25/097* (2013.01); *A01G 25/092* (2013.01); *A01G 25/16* (2013.01); *A01G 25/167* (2013.01)

(58) Field of Classification Search
  CPC .............................. A01G 25/097; A01G 25/16
  See application file for complete search history.

(56) References Cited

U.S. PATENT DOCUMENTS

| | | | | |
|---|---|---|---|---|
| 9,927,580 B2 * | 3/2018 | Bretz | .................... | G02B 6/4416 |
| 2002/0107582 A1 | 8/2002 | Pollak et al. | | |
| 2018/0224617 A1 * | 8/2018 | Lee | ......................... | H01B 11/22 |
| 2019/0295745 A1 * | 9/2019 | Peng | ..................... | G02B 6/4416 |
| 2020/0305366 A1 * | 10/2020 | Burkey | .............. | B60K 31/0008 |
| 2022/0117173 A1 * | 4/2022 | Schweitzer | .......... | H04B 10/278 |

* cited by examiner

*Primary Examiner* — Thomas A Hollweg
*Assistant Examiner* — Kirsten D. Endresen
(74) *Attorney, Agent, or Firm* — HOVEY WILLIAMS LLP

(57) ABSTRACT

A mobile irrigation system broadly comprising a plurality of irrigation spans each including a mobile tower having a wheel assembly for traversing a field and a motor configured to drive the wheel assembly. The mobile irrigation system also comprises a control system including a plurality of controllers each including a processing element, and a plurality of plastic optical fiber (POF) cables serially communicatively connecting the plurality of controllers to form a local area network LAN on the mobile irrigation system.

16 Claims, 3 Drawing Sheets

MOBILE IRRIGATION SYSTEM WITH PLASTIC OPTICAL FIBER NETWORK

BACKGROUND

Agricultural irrigation systems have limited communication infrastructure and often resort to transmitting signals between electronic components via existing electrical power lines. This inhibits usage and potential of peripheral devices that could significantly improve operation of the irrigation systems because only certain signals can be transmitted in specific ways. On the other hand, adding dedicated communication lines greatly increases complexity and cost to the irrigation systems.

SUMMARY

Embodiments of the present invention solve the above-mentioned problems and other problems and provide a distinct advancement in the art of mobile irrigation systems. More particularly, the invention provides a mobile irrigation system that integrates plastic optical fiber (POF) cables for control and data acquisition.

An embodiment of the mobile irrigation system broadly comprises a fixed central pivot, a number of spans, a conduit, an end gun, a control system, and a power supply. Each span also includes a wheel assembly and a motor configured to drive the wheel assembly. The mobile irrigation system may also include an end gun on the outermost span and a power supply for providing electrical power to the motors and the control system.

The control system includes a number of controllers, a number of peripheral devices, and a number of POF cables communicatively connecting the controllers, peripheral devices, and other components of the mobile irrigation system together. The control system forms a local area network (LAN) via the POF cables.

The controllers monitor and control the mobile irrigation system and/or subsystems of the mobile irrigation system and are serially communicatively connected over the LAN via fibers of the POF cables. Each controller may have a processing element and an enclosure with a single opening for each POF cable connected to the controller. In this way, a dedicated POF entry point (in addition to an electrical conductor entry point) is precluded.

The peripheral devices acquire information about the mobile irrigation system such as positions and speeds of the mobile towers and spans, water flow rates, component health/integrity, troubleshooting information, irrigation system or component statuses, hazards to the mobile irrigation system such as wheel rut development and obstacles, and the like. The peripheral devices may also acquire agricultural information such as crop health, soil moisture content, nutrient levels, weather information, and the like.

The POF cables communicatively connect the controllers, the peripheral devices, and other components of the mobile irrigation system to form the LAN. Each POF cable may include a number of fibers, a number of electrical conductors, a tape separator, an inner jacket, a shield, and an outer jacket.

The fibers are communicatively connected between controllers and may be encircled by the electrical conductors, thereby providing additional physical protection (particularly beneficial during field installation) and to minimize flexural strain of the fibers. The fibers may be color coded to facilitate proper connections to the controllers. The fibers may be paired or grouped together or may run independent of each other (i.e., duplex or simplex).

The electrical conductors may be made of copper or other similar conductive material. In one embodiment, the electrical conductors encircle the fibers to provide protection thereto. In another embodiment, some of the electrical conductors may be grouped and/or twisted together.

Some of the POF cables may span between controllers mounted on sequentially spaced mobile towers of the mobile irrigation system. To alleviate loss of signal integrity over long distances, the controllers may be configured to repeat signals before being transmitted on the fiber of the next POF cable.

The above-described mobile-irrigation system provides several advantages. For example, the control system includes a LAN communicatively connecting the controllers, peripheral devices, and other components of the mobile irrigation system via POF cables for control and data acquisition.

The above-described POF cables integrate POF fibers with electrical conductors, which provides several advantages. For example, this precludes the need for a dedicated POF entry point (and/or exit point) at enclosures of the controllers. This also precludes the need for dedicated mechanical supports for separate POF cables and electrical conductor cables along the spans. The POF cables include protective layers for protection of fibers from UV radiation, moisture, corrosion, and the like. Furthermore, the POF cables include fibers surrounded by electrical conductors, which provides physical protection, particularly during field installation, and minimizes flexural strain to the fibers.

BRIEF DESCRIPTION OF THE DRAWING FIGURES

Embodiments of the current invention are described in detail below with reference to the attached drawing figures, wherein:

FIG. 1 is a perspective view of a mobile irrigation system constructed in accordance with an embodiment of the invention;

FIG. 2 a schematic diagram of a control system of the mobile irrigation system of FIG. 1 in accordance with an embodiment of the invention;

Figure 1:
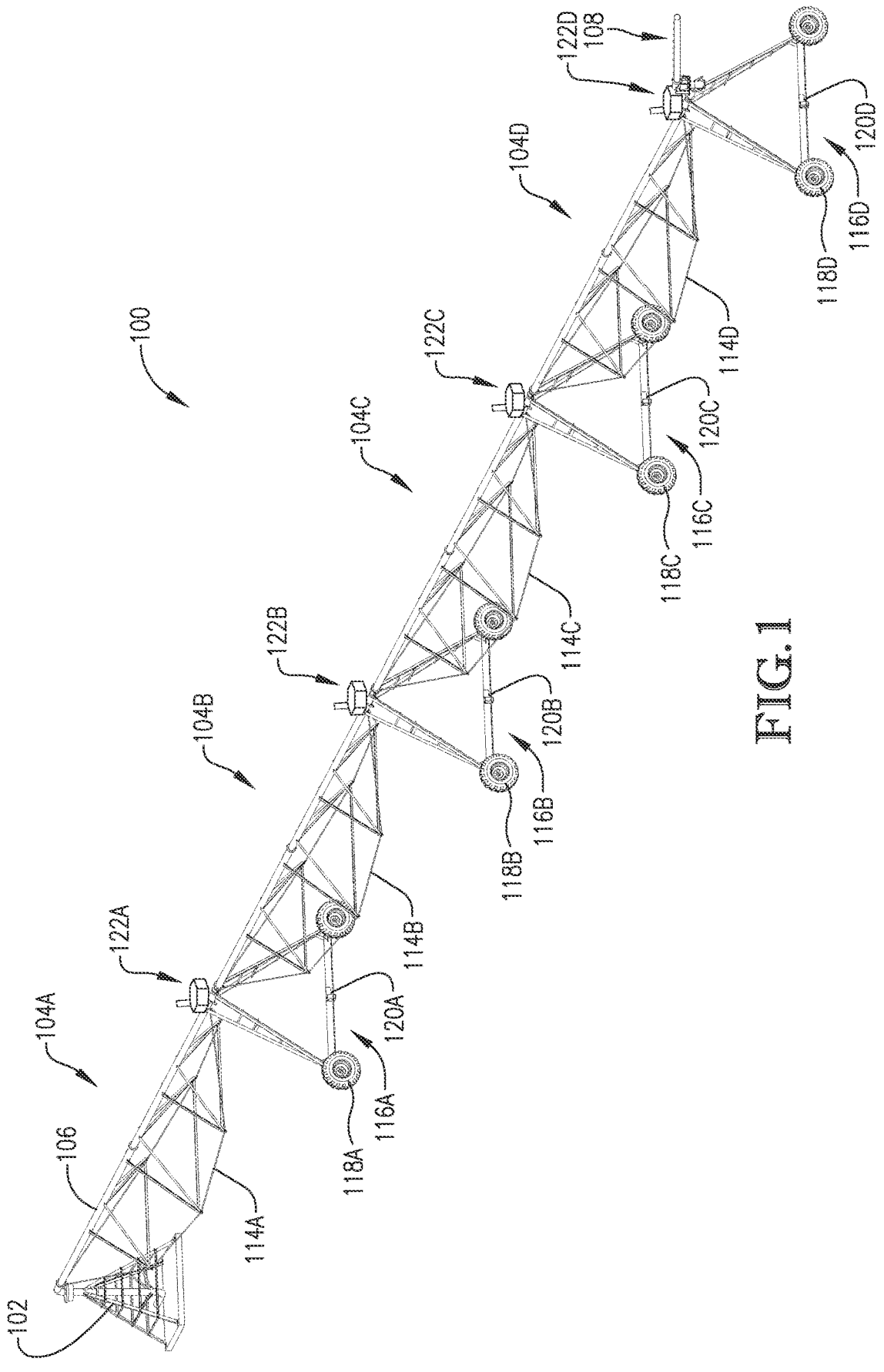

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

Figure 2:
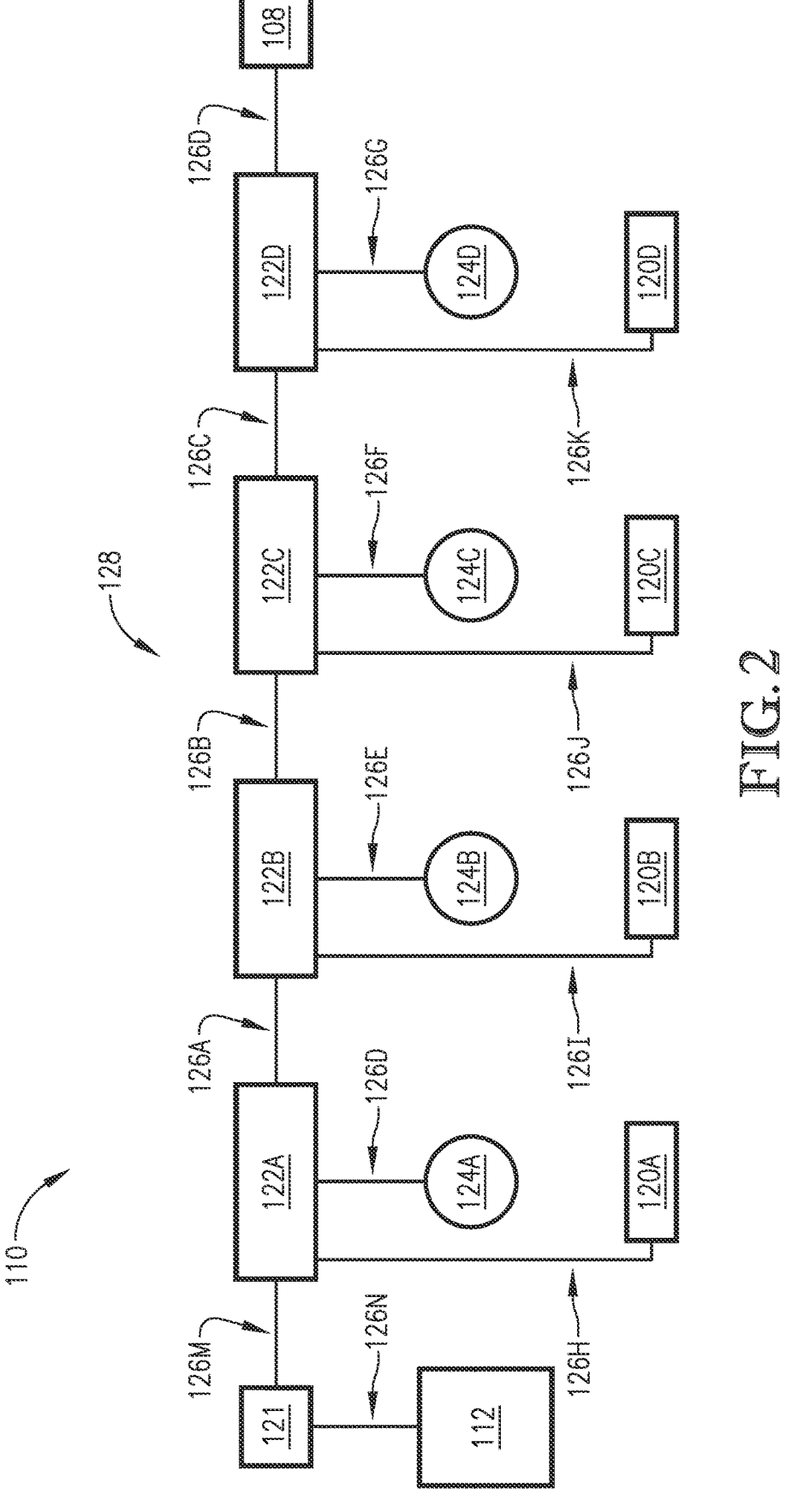
Figures 3, 4, 5:
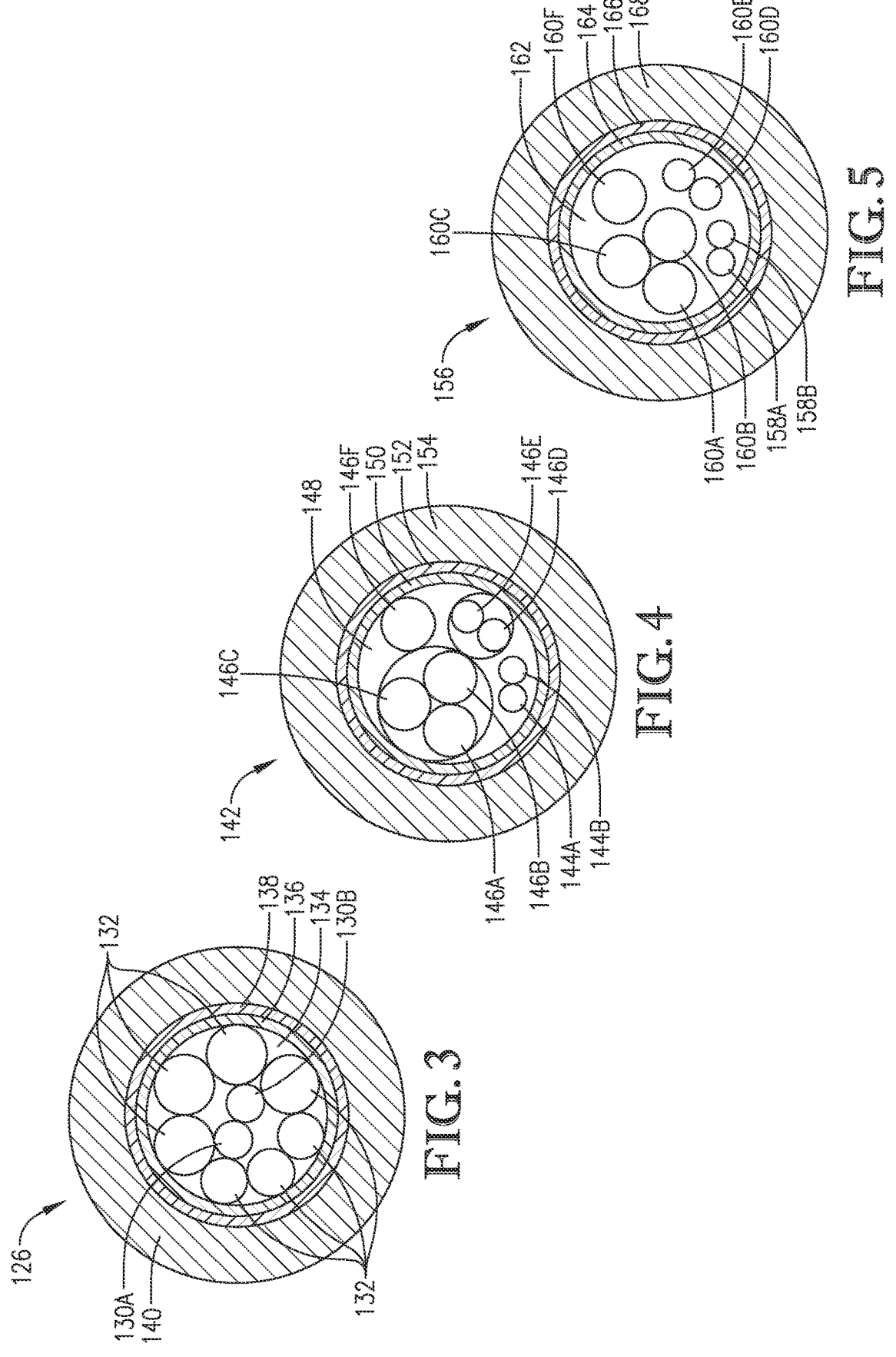
FIG. 3 is a cutaway elevation view of a plastic optical fiber cable of the control system of FIG. 2 in accordance with an embodiment of the invention.
FIG. 4 is a cutaway elevation view of a plastic optical fiber cable constructed in accordance with another embodiment of the invention.
FIG. 5 is a cutaway elevation view of a plastic optical fiber cable constructed in accordance with another embodiment of the invention.

Turning to FIGS. 1-3, a mobile irrigation system 100 constructed in accordance with various embodiments of the invention is illustrated. The mobile irrigation system 100 includes a control system 110 forming a local area network (LAN) via plastic optical fiber cables.

The mobile irrigation system 100 broadly comprises a fixed central pivot 102, a plurality of spans 104A-D, a conduit 106, an end gun 108, the aforementioned control system 110, and a power supply 112. Although a center pivot irrigation system is shown and described, lateral move irrigation systems and stationary irrigation systems may also be utilized.

The fixed central pivot 102 may be a tower or any other support structure about which the spans 104A-D pivot or rotate. The central pivot 102 has access to a well, water tank, or other source of water and may also be coupled with a tank or other source of agricultural products to inject fertilizers, pesticides and/or other chemicals into the water for application during irrigation. The central pivot 102 may supply water to the conduit 106.

Each span 104A-D includes a truss section 114A-D and a mobile tower 116A-D. The spans 104A-D are pivotably connected end-to-end from the central pivot 102.

Each truss section 114A-D includes a plurality of beams rigidly connected to one another to form a framework which carries or otherwise supports the conduit 106. The truss sections 114A-D are suspended above the ground between the mobile towers 116A-D.

The mobile towers 116A-D are positioned at outward ends of the spans 104A-D and each includes at least one wheel 118A-D driven by a drive motor 120A-D. Each drive motor 120A-D may be an electric motor, such as an alternating current (AC) motor or a direct current (DC) motor, and may drive the wheel or wheels 118A-D directly or through a drive shaft in order to propel the mobile towers 116A-D forward or backward. Each mobile tower 116A-D further includes a plurality of beams rigidly connected to one another to form a framework which couples the conduit 106 and the truss sections 114A-D to the wheels 118A-D and the drive motor 120A-D.

The conduit 106 carries water along the length of the spans 104A-D. The conduit 106 may include one or more valves which control the flow of water through the conduit 106 into fluid distribution mechanisms in fluid communication with the conduit 106. Fluid distribution mechanisms may include sprayers, diffusers, or diffusers, each optionally attached to a drop hose, or the like. The opening and closing of the valves may be automatically controlled with an electronic signal or digital data.

The end gun 108 delivers water to peripheral areas of a field tended by the mobile irrigation system 100. To that end, the end gun 108 may be positioned on mobile tower 116D and aimed away from the central pivot 102. The end gun 108 may have valves, actuators, and other controllable components for dictating a spray pattern, intensity, trajectory, or the like dependent on a position of the mobile tower 116D in the field, a wind vector, or other considerations.

The control system 110 may include a central or master controller 121, a plurality of additional tower controllers 122A-D, a plurality of peripheral devices 124A-D, and a plurality of plastic optical fiber (POF) cables 126A-N communicatively connecting the plurality of controllers 122A-D, the plurality of peripheral devices 124A-D, the drive motors 120A-D, the end gun 108, and the power supply 112 to form a LAN 128.

The controllers 121, 122A-D monitor and control the mobile irrigation system 100 and/or subsystems of the mobile irrigation system 100 and may be serially communicatively connected over the LAN 128 via fibers of the POF cables 126A-C and 126M. The controllers 121, 122A-D may be substantially similar to each other and thus only controller 122A will be described in detail.

The controller 122A may comprise one or more processing units, microprocessors (single-core or multi-core), microcontrollers, digital signal processors (DSPs), field-programmable gate arrays (FPGAs), analog and/or digital application-specific integrated circuits (ASICs), or the like, or combinations thereof. The controller 122A may generally execute, process, or run instructions, code, code segments, code statements, software, firmware, programs, applications, apps, processes, services, daemons, or the like. The controller 122A may also include hardware components such as registers, finite-state machines, sequential and combinational logic, configurable logic blocks, and other electronic circuits that can perform the functions necessary for the operation of the current invention. In certain embodiments, the controller 122A may include multiple computational components and functional blocks that are packaged separately but function as a single unit. The controller 122A is in electronic communication with other electronic components such as the other controllers 122B-D and the plurality of peripheral devices 124A-D through serial or parallel links that include universal busses, address busses, data busses, control lines, and the like.

The controller 122A may have an enclosure with a single opening for each POF cable connected thereto. In this way, a dedicated POF entry point (in addition to an electrical conductor entry point) is precluded.

The plurality of peripheral devices 124A-D may acquire information about the mobile irrigation system 100 such as positions and speeds of the mobile towers 116A-D and spans 104A-D, water flow rates, component health/integrity, troubleshooting information, irrigation system or component statuses, hazards to the mobile irrigation system such as wheel rut development and obstacles, and the like. The plurality of peripheral devices 124A-D may also acquire agricultural information such as crop health, soil moisture content, nutrient levels, weather information, and the like. The plurality of peripheral devices 124A-D may include visual spectrum cameras, non-visual spectrum image sensors, lidar sensors, radar sensors, pressure sensors, temperature sensors, voltage sensors, amperage sensors, stress/strain gauge sensors, rotary motion measurement devices, linear motion measurement devices, unmanned aerial vehicles, soil moisture sensors, weather station sensors, global navigation satellite system (GNSS) unit, or any other suitable devices.

The plurality of POF cables 126A-N communicatively connect the controllers 121, 122A-D, the plurality of peripheral devices 124A-D, the drive motors 120A-D, the end gun 108, and the power supply 112 to form the LAN 128. The LAN 128 may be used for command, control, and data acquisition. Each of the plurality of POF cables 126A-N may be substantially similar to each other so only POF cable 126A will be described in more detail.

The POF cable 126A may include a plurality of fibers 130A, B, a plurality of electrical conductors 132, a tape separator 134, an inner jacket 136, a shield 138, and an outer jacket 140. Although the POF cable 126 is shown as an integration of plastic optical fibers and electrical conductors, in one embodiment, separate cables may be used for fibers and for electrical conductors.

The plurality of fibers 130A, B may be communicatively connected between controllers 122A-B and may be encircled by the plurality of electrical conductors 132, thereby providing additional physical protection (particularly beneficial during field installation) and to minimize flexural strain of the plurality of fibers 130A,B. The plurality of fibers 130A, B may be color coded to facilitate proper connections to the controllers 122A, B. Although two fibers 130A, B are shown, any number of fibers, including one fiber, may be used. The fibers 130A,B may be paired or grouped together or may run independent of each other (i.e., duplex or simplex). In one embodiment, fiber 130A may be a transmission line while fiber 130B may be a receiving line (that is, transmission and reception may have dedicated fibers).

The plurality of electrical conductors 132 may be electrically connected between the plurality of controllers 122A, B and may be made of copper or other similar conductive material. The plurality of electrical conductors 132 may be arranged to collectively encircle the plurality of fibers 130A, B. The plurality of electrical conductors 132 may be insulated and may have any suitable size (gauge). For example, some of the plurality of conductors 132 may be #12 American Wire Gauge (AWG), while others are #14 AWG. The plurality of electrical conductors 132 may be used for distribution of electrical power, discrete control signals, and network signals. To that end, the plurality of electrical conductors 132 may have a rating of approximately 600 volts or any other suitable rating. Although seven conductors are shown, any number of conductors may be used. The plurality of electrical conductors 132 may be individually laid or grouped in a twisted lay (e.g., pair, trio, quad). If the electrical conductors 132 exhibit a twisted lay, more than one pairing or grouping may be present.

The tape separator 134 may be wrapped around the plurality of conductors 132 and in turn encircled by the inner jacket 136. The tape separator 134 may be a polyester (e.g., Mylar®) tape separator.

The inner jacket 136 may encircle the tape separator 134. The inner jacket 136 may be made of polyethylene, polyurethane, PVC, thermoplastic elastomer, nylon, or other similar material. In one embodiment, the inner jacket 136 is made of black colored PVC. The inner jacket 136 in turn may be encircled by the shield 138. The inner jacket 136 provides moisture and corrosion resistance to the POF cable 126A. The inner jacket 136 may be optional but must be used if the shield 138 is used.

The shield 138 may encircle the inner jacket and may be made of aluminum or other similar material, and particularly metal. The shield 138 may be encircled by and bonded to the outer jacket 140. The shield 138 provides abrasion resistance and protection from electro-magnetic interference to the POF cable 126A. The shield 138 may be optional.

The outer jacket 140 may encircle the shield 138 (or optionally may be a thicker outer jacket encircling the plurality of conductors 132) and may be made of polyethylene, polyurethane, PVC, thermoplastic elastomer, nylon, or the like. The outer jacket 140 provides mechanical strength, moisture resistance, and sunlight (ultraviolet radiation and other harmful rays) protection to the POF cable 126A.

The power supply 112 provides electrical power to the control system 110. The power supply 112 may be an electrical charging system connected to the grid or an independent wind or solar powered unit.

Some of the plurality of POF cables 126A-N, such as POF cables 126A-C and 126M, may be approximately 225 ft or less in length and may span between controllers mounted on sequentially spaced mobile towers of the mobile irrigation system 100. The spans 104A-D may be approximately 200 ft long and hence the controllers may be spaced approximately 200 ft from each other. Thus, to alleviate loss of signal integrity over long distances (e.g., greater than 225 ft), signals may be repeated at an intermediate controller before being transmitted on the fiber of the next POF cable.

The above-described mobile-irrigation system 100 provides several advantages. For example, the control system 110 includes a LAN communicatively connecting the controllers 122A-D, peripheral devices 124A-D, and other components of the mobile irrigation system 100 via POF cables 126A-M for command, control, and data acquisition.

Turning to FIG. 4, a POF cable 142 constructed in accordance with another embodiment of the invention will now be described. The POF cable 142 may include a plurality of fibers 144A, B, a plurality of electrical conductors 146A-F, a tape separator 148, an inner jacket 150, a shield 152, and an outer jacket 154. The POF cable 142 may be similar to the POF cable 126A described above except for arrangements of the fibers 144A, B and electrical conductors 146A-F.

The plurality of fibers 144A, B may be grouped together in parallel and may be color coded to facilitate proper connections. Although two fibers 144A,B are shown, any number of fibers, including one fiber, may be used.

The plurality of electrical conductors 146A-F may be made of copper or other similar conductive material. Some of the plurality of electrical conductors 146A-F may be grouped and/or twisted together. For example, electrical conductors 146A-C may be grouped and twisted together, electrical conductors 146D,E may be grouped and twisted together, and electrical conductor 146F may run parallel (twisting is acceptable but not required) to electrical conductors 146A-C. For twistings, a minimum of one twist (180 degree rotation) per forty inches may be implemented.

The plurality of electrical conductors 146A-F may be insulated and may have any suitable size (gauge). The plurality of electrical conductors 146A-F may be used for distribution of electrical power and discrete control signals. To that end, the plurality of electrical conductors 146A-F may have a rating of approximately 600 volts or any other suitable rating.

The tape separator 148 may be wrapped around the plurality of electrical conductors 146 and in turn encircled by the inner jacket 150. The tape separator 148 may be a polyester (e.g., Mylar®) tape separator.

The inner jacket 150 may encircle the tape separator 148. The inner jacket 150 may be made of PVC or other similar material. In one embodiment, the inner jacket 150 is made of black colored PVC. The inner jacket 150 in turn may be encircled by the shield 152. The inner jacket 150 provides moisture and corrosion resistance to the POF cable 142. The inner jacket 150 may be optional but must be used if the shield 152 is used.

The shield 152 may encircle the inner jacket and may be made of aluminum or other similar material, and particularly metal. The shield 152 may be encircled by and bonded to the outer jacket 154. The shield 152 provides abrasion resistance and protection from electro-magnetic interference to the POF cable 142. The shield 152 may be optional.

The outer jacket 154 may encircle the shield 152 (or optionally may be a thicker outer jacket encircling the plurality of electrical conductors 146A-F) and may be made of polyethylene, polyurethane, PVC, thermoplastic elastomer, or the like. The outer jacket 154 provides mechanical strength, moisture resistance, and sunlight (ultraviolet radiation and other harmful rays) protection to the POF cable 142.

Turning to FIG. 5, a POF cable 156 constructed in accordance with another embodiment of the invention will now be described. The POF cable 156 may include a plurality of fibers 158A,B, a plurality of electrical conductors 160, a tape separator 162, an inner jacket 164, a shield 166, and an outer jacket 168. The POF cable 156 may be similar to the POF cables 126, 142 described above except for arrangements of the fibers 158A, B and electrical conductors 160.

The plurality of fibers 158A, B may be grouped together in parallel and may be color coded to facilitate proper connections. Although two fibers 158A,B are shown, any number of fibers, including one fiber, may be used.

The plurality of electrical conductors 160A-F may be made of copper or other similar conductive material. Some of the plurality of electrical conductors 146A-F may be grouped together. For example, electrical conductors 160A-C may be grouped together in parallel, electrical conductors 160D,E may be grouped together in parallel, and electrical conductor 160F may run parallel to electrical conductors 160A-C.

The plurality of electrical conductors 160A-F may be insulated and may have any suitable size (gauge). The plurality of electrical conductors 160 may be used for distribution of electrical power and discrete control signals. To that end, the plurality of electrical conductors 160A-F may have a rating of approximately 600 volts or any other suitable rating.

The tape separator 162 may be wrapped around the plurality of conductors 160 and in turn encircled by the inner jacket 164. The tape separator 162 may be a polyester (e.g., Mylar®) tape separator.

The inner jacket 164 may encircle the tape separator 162. The inner jacket 164 may be made of PVC or other similar material. In one embodiment, the inner jacket 164 is made of black colored PVC. The inner jacket 164 in turn may be encircled by the shield 166. The inner jacket 164 provides moisture and corrosion resistance to the POF cable 156. The inner jacket 164 may be optional but must be used if the shield 166 is used.

The shield 166 may encircle the inner jacket and may be made of aluminum or other similar material, and particularly metal. The shield 166 may be encircled by and bonded to the outer jacket 168. The shield 166 provides abrasion resistance and protection from electro-magnetic interference to the POF cable 156. The shield 166 may be optional.

The outer jacket 168 may encircle the shield 166 (or optionally may be a thicker outer jacket encircling the plurality of electrical conductors 160A-F) and may be made of polyethylene, polyurethane, PVC, thermoplastic elastomer, or the like. The outer jacket 168 provides mechanical strength, moisture resistance, and sunlight (ultraviolet radiation and other harmful rays) protection to the POF cable 156.

The POF cables 126A-M, 142, and 156 integrate POF fibers with electrical conductors, which provides several advantages. For example, this precludes the need for a dedicated POF entry point (and/or exit point) at enclosures of the controllers 122A-D. This also precludes the need for dedicated mechanical supports for separate POF cables and electrical conductor cables along the spans 104A-D. The POF cables 126A-M, 142, and 156 include protective layers for protection of fibers from UV radiation, moisture, corrosion, and the like. Furthermore, the POF cables 126A-M include fibers 130A, B surrounded by electrical conductors 132, which provides physical protection, particularly during field installation, and minimizes flexural strain to the fibers 130A,B.

ADDITIONAL CONSIDERATIONS

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Patent claims stemming from this patent application are not intended to be construed under 35 U.S.C. § 112 (f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in any claims stemming from this application.

Having thus described various embodiments of the technology, patentable subject matter may include the following:

The invention claimed is:

1. A mobile irrigation system comprising:
a plurality of irrigation spans each including a mobile tower having:
a wheel assembly for traversing a field; and
a motor configured to drive the wheel assembly; and
a control system comprising:
a plurality of controllers each including a processing element; and
a plurality of plastic optical fiber (POF) cables serially communicatively connecting the plurality of controllers to form a local area network (LAN) on the mobile irrigation system,
each of the plurality of POF cables including two fibers grouped together in parallel, a set of three electrical conductors grouped and twisted together, a set of two electrical conductors grouped and twisted together, and a non-grouped electrical conductor in parallel with the set of three conductors.

2. The mobile irrigation system of claim 1, the control system further comprising a plurality of peripheral devices for obtaining agricultural information or information pertaining to the mobile irrigation system, the plurality of POF cables communicatively connecting the plurality of peripheral devices and the plurality of controllers.

3. The mobile irrigation system of claim 2, the plurality of peripheral devices including at least two of a visual spectrum camera, a non-visual spectrum image sensor, a lidar sensor, a radar sensor, a pressure sensor, a temperature sensor, a voltage sensor, an amperage sensor, a stress/strain gauge sensor, a rotary motion measurement device, a linear motion measurement device, an unmanned aerial vehicle, a soil moisture sensor, a weather sensor, and a GNSS unit.

4. The mobile irrigation system of claim 1, one of the fibers being a transmission line and another one of the fibers being a receiving line.

5. The mobile irrigation system of claim 1, each of the fibers being color coded for facilitating proper connections to the plurality of controllers.

6. The mobile irrigation system of claim 1, each of the plurality of controllers including a housing having an entry point such that the fibers and the electrical conductors of one of the plurality of POF cables pass into the housing via the entry point and bifurcate from each other within the housing.

7. The mobile irrigation system of claim 1, the electrical conductor being configured for distribution of electrical power and discrete control signals between the plurality of controllers.

8. The mobile irrigation system of claim 1, wherein the electrical conductors surround the two fibers to provide protection to the two fibers.

9. The mobile irrigation system of claim 1, wherein the control system is configured to transmit command signals, control signals, and data acquisition signals between the plurality of controllers via the plurality of POF cables.

10. The mobile irrigation system of claim 1, each of the plurality of POF cables including an outer jacket configured to protect the two fibers from moisture, corrosion, and sunlight.

11. The mobile irrigation system of claim 10, each of the plurality of POF cables further including a polyester tape separator between the fiber and the outer jacket.

12. The mobile irrigation system of claim 10, each of the plurality of POF cables further including a polyvinyl chloride (PVC) inner jacket between the fiber and the outer jacket.

13. The mobile irrigation system of claim 10, each of the plurality of POF cables further including an aluminum shield bonded to the outer jacket.

14. A mobile irrigation system comprising:
a plurality of irrigation spans each including a mobile tower having:
    a wheel assembly for traversing a field; and
    a motor configured to drive the wheel assembly; and
a control system comprising:
    a plurality of controllers each including a processing element; and
    a plurality of plastic optical fiber (POF) cables serially communicatively connecting the plurality of controllers to form a local area network (LAN) on the mobile irrigation system, each of the plurality of POF cables including two fibers grouped together in parallel, a set of exactly three electrical conductors grouped together, a set of two electrical conductors grouped together in parallel, and a non-grouped electrical conductor in parallel with the set of three electrical conductors.

15. A mobile irrigation system comprising:
a plurality of irrigation spans each including a mobile tower having:
    a wheel assembly for traversing a field; and
    a motor configured to drive the wheel assembly; and
a control system comprising:
    a plurality of controllers each including a processing element; and
    a plurality of plastic optical fiber (POF) cables serially communicatively connecting the plurality of controllers to form a local area network (LAN) on the mobile irrigation system,
    each of the plurality of POF cables including two fibers grouped together in parallel, a set of three electrical conductors grouped together, a set of exactly two electrical conductors grouped together in parallel, and a non-grouped electrical conductor in parallel with the set of three electrical conductors.

16. A mobile irrigation system comprising:
a plurality of irrigation spans each including a mobile tower having:
    a wheel assembly for traversing a field; and
    a motor configured to drive the wheel assembly; and
a control system comprising:
    a plurality of controllers each including a processing element; and
    a plurality of plastic optical fiber (POF) cables serially communicatively connecting the plurality of controllers to form a local area network (LAN) on the mobile irrigation system,
    each of the plurality of POF cables including two fibers grouped together in parallel, a set of three electrical conductors grouped together, a set of two electrical conductors grouped together in parallel, and exactly one non-grouped electrical conductor in parallel with the set of three electrical conductors.

* * * * *